US012318804B2

(12) United States Patent
Bolyard, Jr. et al.

(10) Patent No.: US 12,318,804 B2
(45) Date of Patent: Jun. 3, 2025

(54) NOZZLE FOR DISCHARGING ONE OR MORE FLUIDS

(71) Applicant: Illinois Tool Works Inc., Glenview, IL (US)

(72) Inventors: Edward W. Bolyard, Jr., Old Hickory, TN (US); Andreas Pahl, Erkrath (DE)

(73) Assignee: Illinois Tool Works Inc., Glenview, IL (US)

( * ) Notice: Subject to any disclaimer, the term of this patent is extended or adjusted under 35 U.S.C. 154(b) by 1107 days.

(21) Appl. No.: 16/971,508

(22) PCT Filed: Feb. 26, 2019

(86) PCT No.: PCT/US2019/019679
§ 371 (c)(1),
(2) Date: Aug. 20, 2020

(87) PCT Pub. No.: WO2019/168875
PCT Pub. Date: Sep. 6, 2019

(65) Prior Publication Data

US 2020/0391242 A1 Dec. 17, 2020

Related U.S. Application Data

(60) Provisional application No. 62/636,562, filed on Feb. 28, 2018.

(51) Int. Cl.
*B05C 5/02* (2006.01)
*B05B 1/14* (2006.01)

(52) U.S. Cl.
CPC .............. *B05C 5/0254* (2013.01); *B05B 1/14* (2013.01); *B05C 5/027* (2013.01)

(58) Field of Classification Search
CPC .......... B05C 5/0254; B05C 5/027; B05B 1/14
See application file for complete search history.

(56) References Cited

U.S. PATENT DOCUMENTS 5,278,749 A 1/1994 De Man
8,985,485 B2 * 3/2015 Budai ...................... D04H 3/16 239/296

(Continued)

FOREIGN PATENT DOCUMENTS

CN 1188824 A 7/1998
CN 1922423 A 2/2007

(Continued)

OTHER PUBLICATIONS

International Search Report issued by ISA/EPO in connection with PCT/US2019/019679 on Jul. 1, 2019.

(Continued)

*Primary Examiner* — Qingzhang Zhou
(74) *Attorney, Agent, or Firm* — Levenfeld Pearlstein, LLC

(57) ABSTRACT

A nozzle includes a back plate having a first inlet passage and a first discharge opening at one end of the first inlet passage, a front plate and a plurality of nozzle plates secured between the back plate and the front plate. The plurality of nozzle plates includes a first plenum plate, a second plenum plate and a discharge plate. The first plenum plate has a first plenum, the second plenum plate has a second plenum and a second plenum projection extending into the second plenum, and the discharge plate is disposed between the first plenum plate and the second plenum plate and has one or more orifices. The first plenum is disposed in fluid communication with the first inlet passage and is configured to receive a first fluid from the first inlet passage via the first discharge opening. The one or more orifices are disposed in fluid communication with the first plenum and are configured to receive the first fluid from the first plenum. The one or more orifices each include an orifice opening at an edge of the discharge plate configured to discharge the first fluid.

19 Claims, 8 Drawing Sheets

(56) References Cited

U.S. PATENT DOCUMENTS

| | | | |
|---|---|---|---|
| 9,561,654 | B2 | 2/2017 | Lessley et al. |
| 9,718,084 | B2 | 8/2017 | Bolyard, Jr. |
| 2013/0084388 | A1 | 4/2013 | Budai et al. |
| 2013/0206062 | A1 | 8/2013 | Cobb et al. |
| 2017/0014853 | A1 | 1/2017 | Lessley et al. |

FOREIGN PATENT DOCUMENTS

| | | | |
|---|---|---|---|
| CN | 102548766 | A | 7/2012 |
| CN | 102905883 | A | 1/2013 |
| CN | 205673142 | U | 11/2016 |
| KR | 1020150045591 | A | 4/2015 |
| WO | 2016085635 | A1 | 6/2016 |

OTHER PUBLICATIONS

Written Opinion issued by ISA/EPO in connection with PCT/US2019/019679 on Jul. 1, 2019.

International Preliminary Report on Patentability issued by ISA/EPO in connection with PCT/US2019/019679 on Sep. 1, 2020.

* cited by examiner

NOZZLE FOR DISCHARGING ONE OR MORE FLUIDS

This is a National Stage Application of International Patent Application No. PCT/US19/19679, filed Feb. 26, 2019, which claims the benefit of and priority to U.S. Provisional Patent Application Ser. No. 62/636,562, filed Feb. 28, 2018, the entireties of which are incorporated fully herein by reference.

The following description relates to a nozzle for discharging one or more fluids, for example, a laminated plate nozzle having one or more strengthening elements.

Laminated plate nozzles include a plurality of intermediate plates secured together between a front plate and a back plate. One or more fluid flow paths are formed in the intermediate plates. The front plate, back plate and intermediate plates are secured together under sufficient compression to form a seal between adjacent and abutting plates. The front plate and the back plate are each typically formed having a greater thickness than the intermediate plates to provide strength and rigidity to the nozzle. At least one plate of the intermediate plates includes an orifice for discharging a first fluid, such as an adhesive. Some laminated plate nozzles also include one or more outlets formed in an intermediate plate for discharging a second fluid, such as air.

The intermediate plates include one or more fluid flow paths to permit flow of one or more of the first fluid and the second fluid through the nozzle to the orifice and/or outlet. The first and/or second fluids may be received in respective fluid flow paths by way of respective inlets formed in one of the front plate or back plate.

Examples of such nozzles are shown and described, for example, in U.S. patent application Ser. No. 15/800,878 to Bolyard, U.S. Pat. No. 9,718,084 to Bolyard, US Pat. Appl. Pub. No. 2017/0014853 to Lessley et al., U.S. Pat. No. 9,561,654 to Lessley et al., and U.S. Pat. No. 8,985,485 to Budai et al., each of which is commonly owned and assigned with the present application, and the disclosures of which are incorporated herein by reference, in their entireties.

In known laminated plate nozzles the flow paths formed in the intermediate plates may vary in cross-sectional area. In addition, the fluid or fluids in the flow paths may be provided at relatively high pressures. However, a stiffness or rigidity of an intermediate plate decreases with an increase in cross-sectional area of a flow path formed in the intermediate plate. Thus, where a cross-sectional area of the flow path in an intermediate plate is relatively large compared to a total area of the intermediate plate, the intermediate plate may deflect, i.e., bend or otherwise deform, under pressure from the fluid or fluids. In addition, or alternatively, the fluid, under pressure in a relatively large cross-sectional area of the flow path, may apply pressure to an adjacent intermediate plate, causing the adjacent intermediate plate to deflect.

Further, in known laminated plate nozzles, a flow path portion having a relatively large cross-sectional area creates a volume within the nozzle into which an adjacent intermediate plate may bend or deflect. That is, the relatively large cross-sectional flow path portion in one plate results in a non-continuous line of contact extending through the laminated plate nozzle in a thickness direction (i.e., a direction in which the nozzle plates are stacked). Deflection of an intermediate plate may cause similar deflection in adjacent intermediate plates as well. The deflection of an intermediate plate may adversely affect the seal formed between the intermediate plate and adjacent plates, which may lead to unintended leakage of the fluid or fluids between the plates and/or a decrease in pressure of the fluid within the nozzle.

Subsequently, a desired level of accuracy or precision in the discharge of the fluid may not be accomplished. Thus, fluid pressure within the nozzle must be controlled and maintained below a predetermined level to maintain the desired seal.

In some existing nozzles of the type described above, the orifices and outlets are arranged across a width of one or more of the intermediate plates. However, under the fluid pressure constraints described above, the fluid or fluids may not be adequately distributed, or not be distributed at an adequate pressure, to orifices and/or outlets disposed toward laterally outer edges of the intermediate plates. For example, a flow path in the nozzle may include a first portion having a relatively small cross-sectional area formed in the intermediate plates at a substantially central location in a width direction of the plates. To distribute the fluid across a width of the intermediate plates to the outwardly positioned orifices or outlets, the flow path includes a second portion having a relatively large cross-sectional area that receives the fluid from the first portion. However, the fluid pressure may decrease in the second portion due to the increased cross-sectional area, and distribution of the fluid to laterally outward positioned orifices and/or outlets may be adversely affected, due to the reduced fluid pressure.

In an effort to overcome this problem, some nozzles of the type described above include a flow diverting element in the second portion of the flow path having the relatively large cross-sectional area. The flow diverting element is aligned with the first portion of the flow path and may include a section having a shape or profile that generally corresponds to that of the first portion. The flow diverting element is positioned relative to the first portion such that fluid entering the second portion from the first portion is diverted laterally outward in the width direction before flowing vertically, i.e., in a height direction. Accordingly, the fluid received from the first portion, at a relatively high pressure, is diverted laterally outward so that the fluid may be received at laterally outer portions of the flow path, and subsequently, at laterally outward positioned orifices and/or outlets at a higher pressure. Thus, by use of the flow diverting element, some adverse effects with respect to fluid distribution and fluid pressure in the width direction may be reduced.

However, the intermediate plates in nozzles having the flow diverting element of the type described above, must be precisely manufactured to align the flow diverting element to the first portion of the flow path. In some instances, even a slight misalignment may cause a disruption in flow, or a turbulent flow, leading to an undesirable accumulation in back pressure or uneven downstream flow of the fluid. Such a pressure accumulation may cause deflection in one or more of the intermediate plates, which as detailed above, may adversely affect the seal between plates. An uneven downstream flow may result in inconsistent fluid application characteristics. Further, the use of flow diverters in relatively large cross-sectional portions of flow paths may create undesirable localized areas of high fluid pressure, relatively large pressure gradients within the flow path or uneven flow within the flow path. Thus, the manufacture of the intermediate plates described above may be time consuming, expensive and difficult.

Further, the flow diverting elements may need to be formed having a relatively large cross-sectional area. Due to size constraints in the nozzle, in some cases, a second fluid flow path for a second fluid must be formed extending through the flow diverting element. However, the flow diverting element, formed as a cantilevered member, may be susceptible to deflection under internal pressure from the second fluid, or external pressure from the first fluid being diverted. Accordingly, a seal formed by adjacent, abutting plates around the second fluid flow path may be susceptible to inadvertent leakage or pressure loss as well.

Accordingly, it is desirable to provide a nozzle, such as a laminated plate nozzle, for discharging one or more fluids, having improved resistance to deflection under relatively higher fluid pressures while being easier to manufacture than existing nozzles.

SUMMARY

According to one aspect, a nozzle is provided which includes a back plate having a first inlet passage and a first discharge opening at one end of the first inlet passage, a front plate, and a plurality of nozzle plates secured between the back plate and the front plate. The plurality of nozzle plates includes a first plenum plate, a second plenum plate and a discharge plate. The first plenum plate has a first plenum, the second plenum plate has a second plenum and a second plenum projection extending into the second plenum, and the discharge plate is disposed between the first plenum plate and the second plenum plate and has one or more orifices. The first plenum is disposed in fluid communication with the first inlet passage and is configured to receive a first fluid from the first inlet passage via the first discharge opening, and the one or more orifices are disposed in fluid communication with the first plenum and are configured to receive the first fluid from the first plenum. The one or more orifices each include an orifice opening at an edge of the discharge plate configured to discharge the first fluid.

The first plenum may increase in width moving along a height direction toward a base of the first plenum. In addition, the second plenum projection extends in a height direction from a base of the second plenum. The second plenum projection may also include a section of increased width.

The back plate may further include a second fluid inlet passage having a second discharge opening at one end, and the first plenum plate and discharge plate may further include a second fluid through passage disposed in fluid communication with the second fluid inlet passage and configured to receive a second fluid from the second fluid inlet passage via the second discharge opening. The second plenum is disposed in fluid communication with the second fluid through passage and is configured to receive the second fluid from the second fluid through passage. One or more nozzle plates of the plurality of nozzle plates may further include one or more outlets disposed in fluid communication with the second plenum, wherein the one or more outlets are configured to receive the second fluid from the second plenum, each outlet of the one or more outlets having an outlet orifice formed in an edge of the nozzle plate configured to discharge the second fluid.

A free end of the second plenum projection may be spaced in the height direction the second fluid through passage. The first plenum plate may further include a first plenum projection extending into the first plenum and the first plenum projection may include a section of increased width. A free end of the first plenum projection may be spaced in a height direction from the first discharge opening.

The one or more outlets may be formed in the discharge plate.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
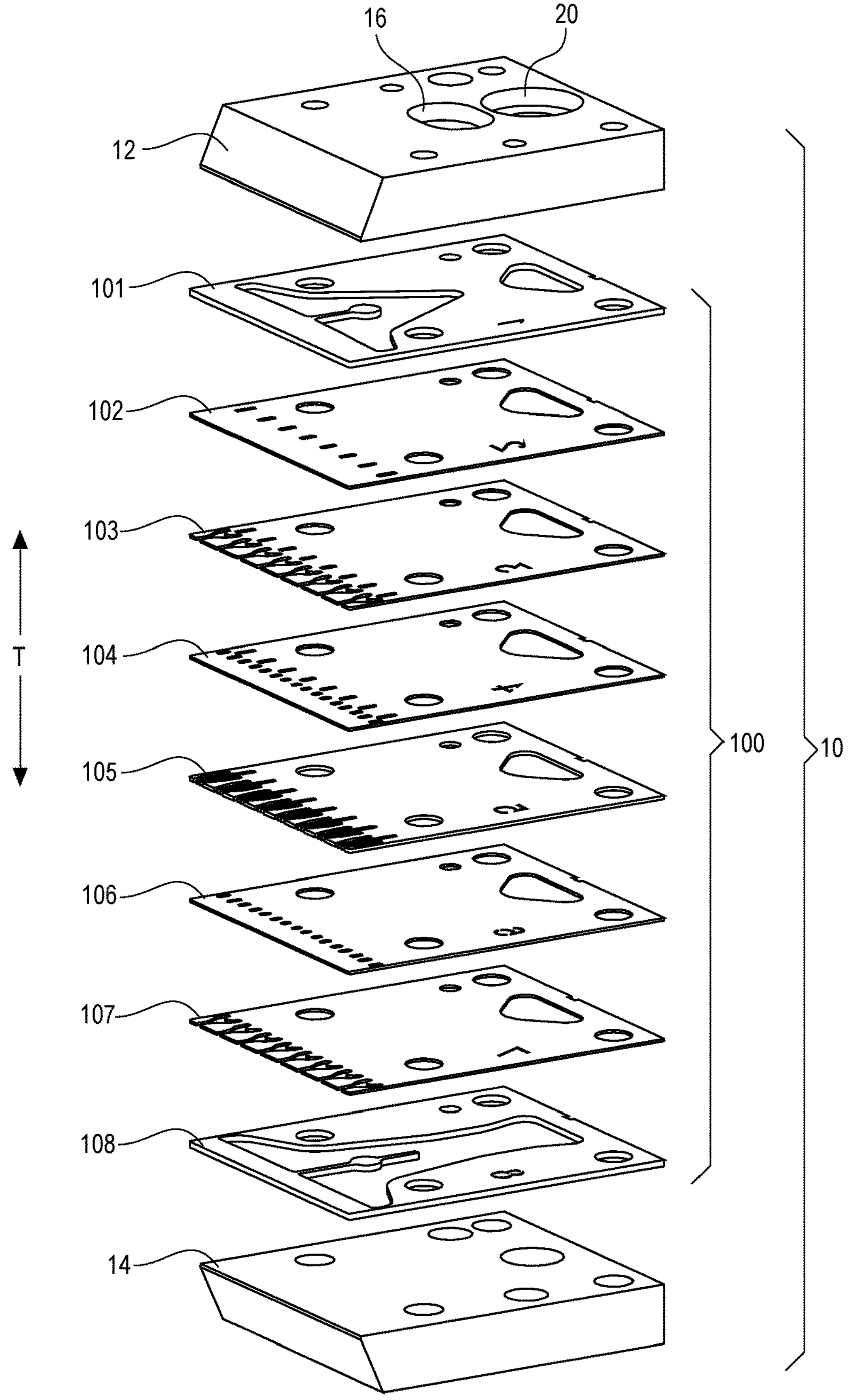
FIG. 1 is an exploded view of a nozzle according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is an exploded view of a nozzle 10 according to an embodiment described herein. Referring to FIG. 1, the nozzle 10 may be a laminated plate nozzle (LPN) having a back plate 12, a front plate 14 and a plurality of nozzle plates 100 disposed therebetween. The back plate 12, front plate 14 and plurality of laminated nozzle plates 100 therebetween are secured together by a compressive force sufficient to form a seal between adjacent and abutting nozzle plates. The nozzle 10 is configured to discharge a first fluid from one or more orifices 110 (see, for example, FIG. 3F) formed in at least one plate of the plurality of nozzle plates 100. In one embodiment, the first fluid may be a viscous fluid that is a liquefied material heated or non-heated between about 10 and 50,000 centipoise (cps). The first fluid may be, for example, an adhesive, such as a hot-melt adhesive.

Referring still to FIG. 1, the back plate 12 includes a first inlet passage 16 configured to receive the first fluid from a first fluid supply source (not shown) and allow the first fluid to flow in the back plate 12. The first inlet passage 16 may terminate at a first discharge opening 18 (FIG. 4), through which the first fluid may exit the back plate 12. The first discharge opening 18 is disposed in fluid communication with a first fluid flow path 112 formed in one or more plate of the plurality of nozzle plates 100. As described below, and shown in FIGS. 2A and 3B-3F, for example, the first fluid flow path 112 extends to, and is in fluid communication with, the one or more orifices 110. Thus, the first fluid may be received in the back plate 12 at the first inlet passage 16, exit the back plate 12 through the first discharge opening 18, and flow in the first fluid flow path 112 to the one or more orifices 110 from which the first fluid may be discharged from nozzle 10.

In one embodiment, the first fluid flow path 112 may be formed by one or more openings formed in one or more plates of the plurality of nozzle plates 100. In one embodiment, the first fluid flow path 112 may be split into a plurality of first fluid passages 114, formed by aligned openings of the one or more openings, to fluidically connect a plurality of orifices 110 to the first inlet passage 16.

Figure 2A:
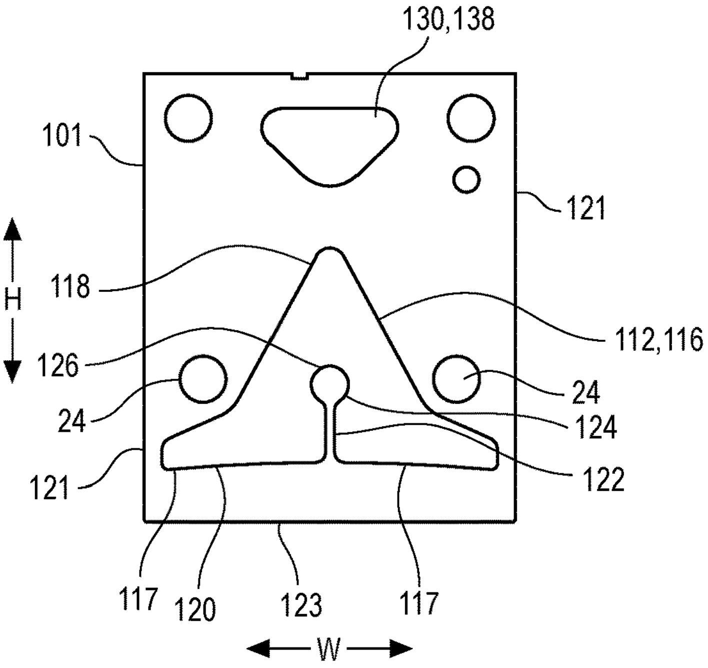
FIG. 2A is a plan view of a nozzle plate of the nozzle shown in FIG. 1, according to an embodiment.

FIG. 2A is a plan view a first nozzle plate 101 of the plurality of nozzle plates 100, according to an embodiment. The first nozzle plate 101 is also referred to herein as the first plenum plate 101. With reference to FIG. 2A, at least a portion of the first fluid flow path 112 may be formed in the first plenum plate 101. For example, in one embodiment, the first fluid flow path 112 includes a first plenum 116. The first plenum 116 is configured to receive the first fluid from the back plate 12 via the first inlet passage 16. In one embodiment, the first plenum 116 may be generally triangular in shape, but is not limited thereto. In one embodiment, the first plenum 116 may include one or more lower feet portions 117 which extend outward in the width direction W relative to a generally triangular shaped section at an upper portion of the first plenum 116. The first discharge opening 18 of the first inlet passage 16 may be aligned with the first plenum 116 at or near an apex 118 of the first plenum 116. Accordingly, in one embodiment, the first plenum 116 is configured to receive the first fluid at or near the apex 118 and accommodate flow of the first fluid in a height direction H toward a base 120 of the first plenum 16 and a width direction W toward opposite lateral edges 121 of the first plenum plate 101. In one embodiment, the base 120 may have generally curved or angled profile extending upwardly relative a lower edge 123 of the first plenum plate 101, moving inward toward the center of the plate 101 in the width direction. The first fluid may flow in the first plenum 116, for example, under pressure provided by a pump (not shown) that supplies and/or meters the first fluid to the nozzle 10. The first plenum 116 may be formed in one or more nozzle plates of the plurality of nozzle plate 100.

The one or more orifices 110 for discharging the first fluid are fluidically connected to the first plenum 116 and thus, are configured to receive the first fluid from the first plenum 116. In one embodiment, the one or more orifices 110 may be fluidically connected to the first plenum 116 such that the one or more orifices 110 are configured to receive the first fluid directly from the first plenum 116. That is, the one or more orifices 110 may be formed in a nozzle plate of the plurality of nozzle plates 100 disposed immediately adjacent to, and abutting, the nozzle plate(s) in which the first plenum 116 is formed. In one embodiment, a nozzle plate 105 in which the one or more orifices 110 are formed is referred to herein as a discharge plate 105. The one or more orifices 110 may be formed in a single, common discharge plate 105, or in a plurality of discharge plates. In one embodiment, the one or more orifices 110 are arranged substantially in a line defined by a plane of the discharge plate 105.

In another embodiment, a portion of the first fluid flow path 112 may extend between the first plenum 116 and the one or more orifices 110. For example, one or more nozzle plates having a portion of the first fluid flow path 112 formed therein may be disposed between the first plenum plate 101 and the discharge plate 105. In one embodiment, such a portion of the first fluid flow path 112 may be formed by the first fluid passages 114 (FIGS. 3B-3E), as described further below. The one or more orifices 110 are configured to receive the first fluid from the first plenum 116 via the portion of the first fluid flow path 112 downstream from the first plenum 116.

Referring still to FIG. 2A, the first plenum plate 101 may optionally include a first projection 122 (also referred to herein as a "first plenum projection") extending into the first plenum 116. The first projection 122 may vary in width along a height direction H, such that the first projection 122 includes at least one section 124 having an increased width compared to another section of the projection 122. In one embodiment, the first projection 122 may add stiffness and/or rigidity to the first plenum plate 101, and thus, may serve as a strengthening element. In one embodiment, the first projection 122 is not configured to direct flow of the first fluid or to distribute fluid pressure within the first plenum 116 in a specified or predetermined manner. That is, proper or desired flow and distribution of the first fluid within the first plenum 116, and/or distribution of fluid pressure within the first plenum 116, is substantially not affected by the first projection 122, nor is the first projection 122 required to achieve a desired flow or distribution of the first fluid within the first plenum 116. To this end, a tip or free end 126 of the projection 122 may be spaced in the height direction H from a portion of the first plenum 116 configured to receive the first fluid from the first inlet passage 16. Said differently, the free end 126 of the first projection 122 may be spaced in the height direction H from the first discharge opening 18 in the back plate 12, such that the first fluid flows in the height H within the plenum 116 before reaching the free end 126 of the projection 122.

The first projection 122 may be positioned on the first plenum plate 101 at a location where a bending moment on the plate 101 or an adjacent plate is expected to be the greatest in response to internal fluid pressure. For example, in one embodiment, the bending moment may be expected to be the greatest at a substantially central location along a width direction W. The central location may be halfway between fastener bores 24, described further below. In one embodiment, the first projection 122 may be positioned at a location at or near one half a width of the first plenum plate 101, and extend in the height direction H. However, the present disclosure is not limited to such a configuration.

Referring again to FIG. 1, in one embodiment, the nozzle 10 may also be configured to receive and discharge a second fluid through one or more first outlets 128 (FIG. 3F) formed in one or more nozzle plates of the plurality of nozzle plates 100. For example, in one embodiment, the back plate 12 may further include a second inlet passage 20, configured to receive the second fluid and allow for flow of the second fluid within the back plate 12. The second inlet passage 20 terminates at a second discharge opening 22 (FIG. 4) of the back plate 12, through which the second fluid may exit the back plate 12. According to an embodiment, a second fluid flow path 130 (FIGS. 3B-3I) is formed in one or more plates of the plurality of plates 100, and is configured to receive the second fluid from the second inlet passage 20 of the back plate 12. The one or more outlets 128 are fluidically connected to the second fluid flow path 130 and are configured to receive the second fluid from the second fluid flow path 130. The second fluid may then be discharged from the one or more outlets 128. In one embodiment, the second fluid is air or other suitable gas, and in a further embodiment, may be compressed air.

Figure 2B:
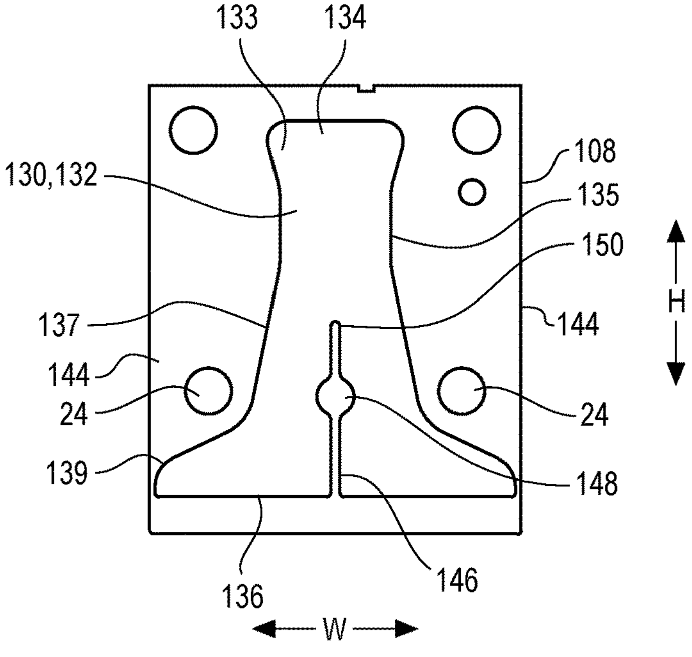
FIG. 2B is a plan view of another nozzle plate of the nozzle shown in FIG. 1, according to an embodiment.

FIG. 2B is a plan view of a second plenum plate 108, according to an embodiment. In one embodiment, the second fluid flow path 128 includes a second plenum 132 formed in the second plenum plate 108 of the plurality of nozzle plates 100. The second plenum 132 includes an upper end 134 and a lower end 136. It is understood that the directional terms "upper" and "lower" do not limit the second plenum 132, second plenum plate 108, or the nozzle 10 to a particular orientation, but rather, are used for reference and consistency with the orientation of the features as shown in the figures. In one embodiment, a width of the second plenum 132 may vary along the height direction H. For example, as shown in FIG. 2B, a width of the second plenum 132 may increase along at least a portion of its height in the height direction H toward the lower end 136. In one embodiment, the second plenum 132 may have a first section 133 of decreasing width along a direction from the upper end 134 toward the lower end 136, a second section 135 of substantially constant width along a direction from the upper end 134 toward the lower end 136, a third section 137 of increasing width along a direction from the upper end 134 toward the lower end 136, a fourth section 139 of increasing width, increasing in width at a higher rate than the third section 137, along a direction from the upper end 134 to the lower end 136. In one embodiment, the first, second, third and fourth sections 133, 135, 137, 139 may be arranged in series along a direction from the upper end 134 to the lower end 136. It is understood, however, that the present disclosure is not limited to such a configuration of the second plenum 132. For example, one or more of above-described sections may be omitted from the second plenum 132, or additional sections of varying width may be included. In one embodiment, two or more sections of increasing width may be included.

In one embodiment, the second plenum plate 108 may be disposed on an opposite side of the discharge plate 105 from the first plenum plate 101. Accordingly, a first portion of the second fluid flow path 130 may be formed in the plurality of nozzle plates 100 to extend through at least the first plenum plate 101 and the discharge plate 105. In one embodiment, the first portion may be formed as a second fluid through passage 138 (FIGS. 2A, 3B-3H). The second fluid through passage 138 is fluidically connected to the second inlet passage 20 and is configured to receive the second fluid from the second inlet passage 20, in particular, the second discharge opening 22. The second plenum 132 is fluidically connected to the second fluid through passage 138 and is configured to receive the second fluid therefrom.

The second plenum 132 may also be fluidically connected to a second portion of the second fluid flow path 130 extending between the second plenum 132 and the one or more outlets 128. The second portion of the second fluid flow path 130 may be, for example, second fluid delivery passages 152, formed in one or more of the plurality of nozzle plate 100. However, it is understood that this example is non-limiting and other configurations are envisioned. For example, in one embodiment, the one or more outlets 128 may be disposed in a nozzle plate immediately adjacent to an abutting the second plenum plate 108, such that the second fluid may be received in the one or more outlets 128 directly from the second plenum 132. In one embodiment, the one or more outlets 128 are disposed on the same plate as the one or more orifices 110, i.e., the discharge plate 105. In other embodiment, the one or more outlets 128 may be disposed on a nozzle plate separate from the discharge plate 105.

In addition, or alternatively, the nozzle 10 may include one or more second outlets 140 for discharging the second fluid and/or one more third outlets 142 for discharging the second fluid. Thus, in the embodiments described herein, the nozzle 10 may include at least one of the one or more first outlets 128, the one or more second outlets 140, and the one or more third outlets 142. In one embodiment, the one or more first outlets 128, second outlets 140, and third outlets 142 may be formed in different plates of the plurality of nozzle plates 100.

In one embodiment, the upper end 134 of the second plenum 132 is generally aligned with the second fluid through passage 138 and is configured to receive the second fluid from the through passage 138. The second plenum 132 is configured to allow the second fluid to flow generally along the height direction H from the upper end 134 toward the lower end 136, and in the width direction W, toward lateral edges 144 of the second plenum plate 108, such that the second fluid is distributed in the width direction W.

Referring still to FIG. 2B, the second plenum plate 108 may further include a second projection 146 (also referred to herein as a "second plenum projection") extending into the second plenum 132. The second projection 146 may vary in width along the height H direction, such that the second projection 146 includes at least one section 148 having an increased width compared to another section of the projection 146. In one embodiment, the second projection 146 may add stiffness and/or rigidity to the second plenum plate 108, and thus, may serve as a strengthening element. In one embodiment, the second projection 146 is not used to direct flow of the second fluid or to distribute pressure within the second plenum 132 in a predetermined manner. That is, proper or desired flow and distribution of the second fluid within the second plenum 132 is substantially not affected by the second projection 146, nor is the second projection 146 required to achieve a desired flow or distribution of the second fluid within the second plenum 132. To this end, a tip or free end 150 of the second projection 146 is spaced, in the height direction H, from a portion of the second plenum 132 configured to receive the second fluid from the second fluid through passage 138. Said differently, the free end 150 of the second projection 146 is spaced in the height direction H from the second fluid through passage 138.

In one embodiment, the second projection 146 may be positioned on the second plenum plate 108 at a location where a bending moment on the plate 108 and/or an adjacent plate is expected to be the greatest in response to internal fluid pressure. For example, in one embodiment, the bending moment may be expected to be the greatest at a substantially central location along the width direction W. The central location may be halfway between fastener openings 24, described further below. In one embodiment, the second projection 146 may be positioned at a location at or near one half a width of the second plenum plate 108, and extend in the height direction H. However, the present disclosure is not limited to such a configuration.

In addition to adding stiffness to respective plenum plates 101, 108, the first and second projections 122, 146 may also increase stiffness, or resistance to bending, of the nozzle 10. For example, the first and second projections 122, 146 may each have a thickness that is the same as a thickness of the remaining portions of the respective plenum plates 101, 108 of which they are a part. That is, the first and second plenum plates 101, 108 may each have a substantially constant or uniform thickness. As such, the first and second projections 122, 146 are substantially fixed against deflection in the thickness direction T of the nozzle 10 because the projections 122, 146 are supported on both sides in the thickness direction T by immediately adjacent and abutting nozzle plates. For example, the first projection 122 may be supported in the thickness direction T between the back plate 12 on one side, and an immediately adjacent and abutting nozzle plate on another side, such as nozzle plate 102. Similarly, the second projection 146 may be supported in the thickness direction T between the front plate 14 on one side and another immediately adjacent and abutting nozzle plate on another side, such as nozzle plate 107.

In addition, bending of a nozzle plate immediately adjacent to one of the plenum plates 101, 108 may be substantially limited or prevented due, at least in part, to the first and second projections 122, 146. For example, a nozzle plate immediately adjacent to the first plenum plate 101, such as a nozzle plate 102, may otherwise be susceptible to bending or deflecting into the first plenum 116. However, the first projection 122 is configured to provide support against bending of the adjacent nozzle plate 102 into the first plenum 116. For example, a force applied from the adjacent nozzle 102 toward the first plenum plate 101 in the vicinity of the plenum 116 may be opposed by a reaction force from the first projection 122, further supported by the back plate 12, to substantially prevent bending of the nozzle plate 102. In another example, a force from the adjacent nozzle plate 107 toward the second plenum 132 in the second plenum plate 108 may be opposed by a reaction force from the second projection 146, further supported by the front plate 14, to substantially prevent bending of the nozzle plate 107. In one embodiment, the increased width portion 124 of the first projection 122 and the increased width portion 148 of the second projection 146 may be aligned in with one another in the width direction W and the height direction H. In one embodiment, the first projection 122 and the second projection 146 are positioned such that a continuous line of contact 'C' extends through the nozzle plates 100 in the thickness direction T, as shown in FIG. 1. The line of contact 'C' may extend through the respective increased width portions 124, 148 of the first and second projections 122, 146, but is not limited thereto.

Referring again to FIG. 1, in an embodiment, the plurality of nozzle plates 100 may include eight nozzle plates. However, it is understood that the present disclosure is not limited to eight nozzle plates, and that additional or fewer nozzle plates may be used depending, for example, on a desired application for the nozzle 10 including a number and types of fluids to be discharged. Accordingly, references made to a number of nozzle plates is for the purpose of example and illustration, and does not limit the present application to the number of nozzle plates shown or described.

In the embodiment of FIG. 1, the nozzle 10 includes the first plenum plate 101, the discharge plate 105 and the second plenum plate 108. The nozzle 10 may also include one or more of the second nozzle plate 102, a third nozzle plate 103 and a fourth nozzle plate 104 disposed between the first plenum plate 101 and the discharge plate 105, and a sixth nozzle plate 106 and the seventh nozzle plate 107 disposed between the discharge plate 105 and the second plenum plate 108. The plates 101-108 may be arranged in series in the thickness direction T.

Figure 3A:
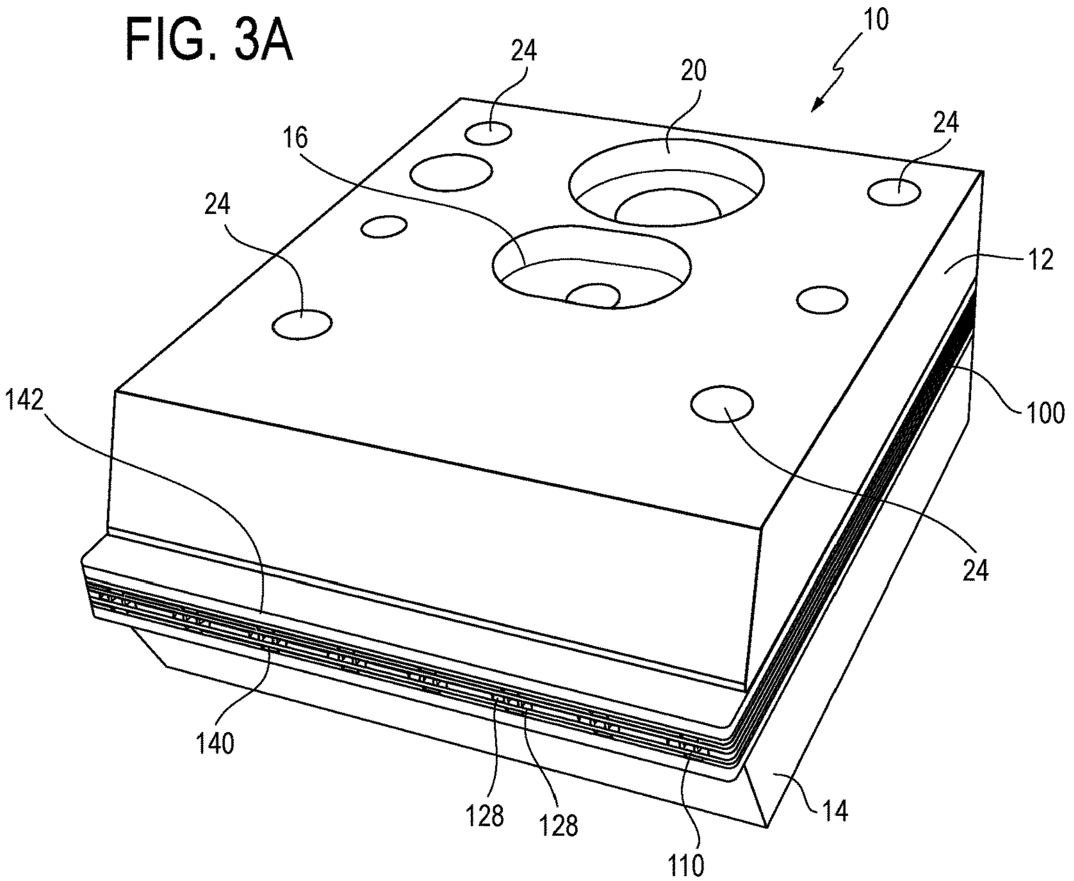
FIGS. 3A-3I are perspective views showing the nozzle and various cut-away views of nozzle plates within the nozzle of FIG. 1, according to an embodiment.

FIG. 3A is a perspective view of the nozzle 10, according to an embodiment. Referring to FIG. 3A, the nozzle 10 includes the back plate 12, the front plate 14 and the plurality of nozzle plates 100 therebetween. Referring to FIG. 3A, the back plate 12 includes the first inlet passage 16, and optionally, the second inlet passage 20 as described above. The nozzle 10 may also include one or more fastening bores 24 extending through the back plate 12, front plate 14 and the plurality of nozzle plates 100. The one or more fastening bores 24 are configured to receive a suitable fastener, such as, but not limited to, a screw, bolt or similar fastener, including threaded fasteners (not shown). Accordingly, in one embodiment, the one or more fastening bores 24 may be threaded to engage the suitable fastener. It is understood that although fastening bores 24 are shown in some figures, labels for the fastening bores 24 may be omitted for clarity. Those having skill in the art will recognize such unlabeled features as being fastener bores, for example, by the positioning and alignment of these features with the fastening bores 24 labeled in other figures.

Figure 4:
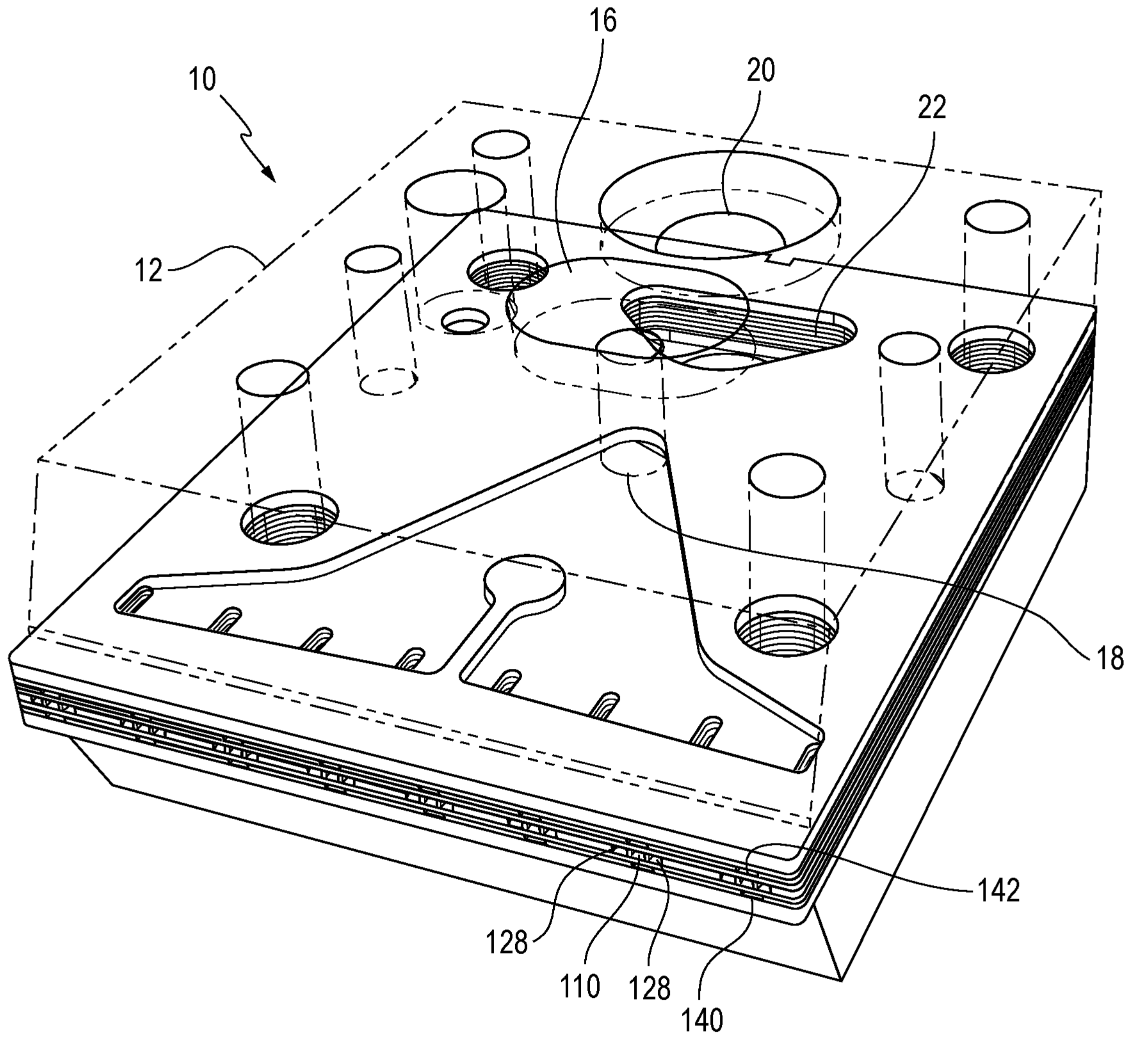
FIG. 4 is a perspective view of the nozzle of FIG. 3A with the transparent view of a back plate to show internal components, according to an embodiment.

With further reference to FIG. 3A, and as also shown in FIG. 4, in one embodiment, the one or more orifices 110 and the one or more first outlets 128 for discharging the first fluid and the second fluid, respectively, may be arranged along a common line. In addition, the one or more second outlets 140 for discharging the second fluid may be arranged along a common line on another nozzle plate, and the one or more third outlets 142 for discharging the second fluid may be arranged along a common line on still another nozzle plate of the plurality of nozzle plates 100. It is appreciated that although FIGS. 3A and 4 depict a plurality of the orifices 110, first outlets 128, second outlets 140 and third outlets 142, reference numbers identifying each and every one of the same may be omitted for clarity.

Figure 3B:
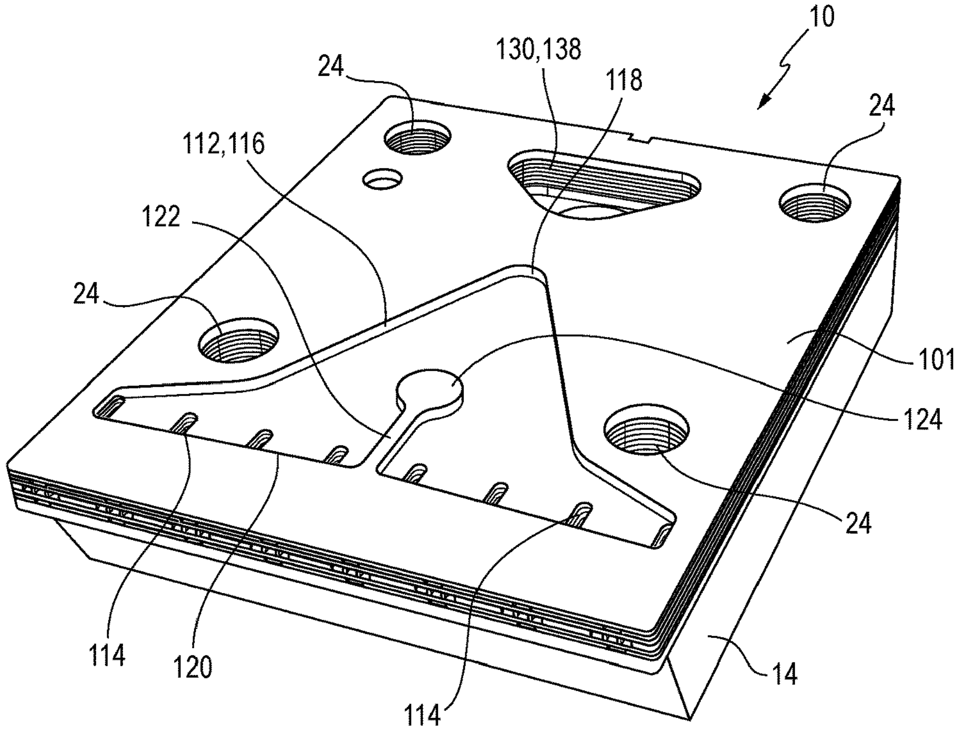

FIG. 3B is a perspective view of the nozzle 10, with the back plate 12 removed to show the first plenum plate 101. The first plenum plate 101, as described above with reference to FIG. 2A, has the first plenum 116 formed therein and includes the first projection 122 extending into the first plenum 116. The first plenum 116 is configured to receive the first fluid from the first inlet passage 16 of the back plate 12. In one embodiment, the first plenum plate 101 may also include a portion of the second fluid through passage 138. The second fluid through passage 138 is generally aligned with the second discharge opening 22 of the second inlet passage 20 in the back plate 12. Accordingly, the second fluid through passage 138 is configured to receive the second fluid from the back plate 12.

Figure 3C:
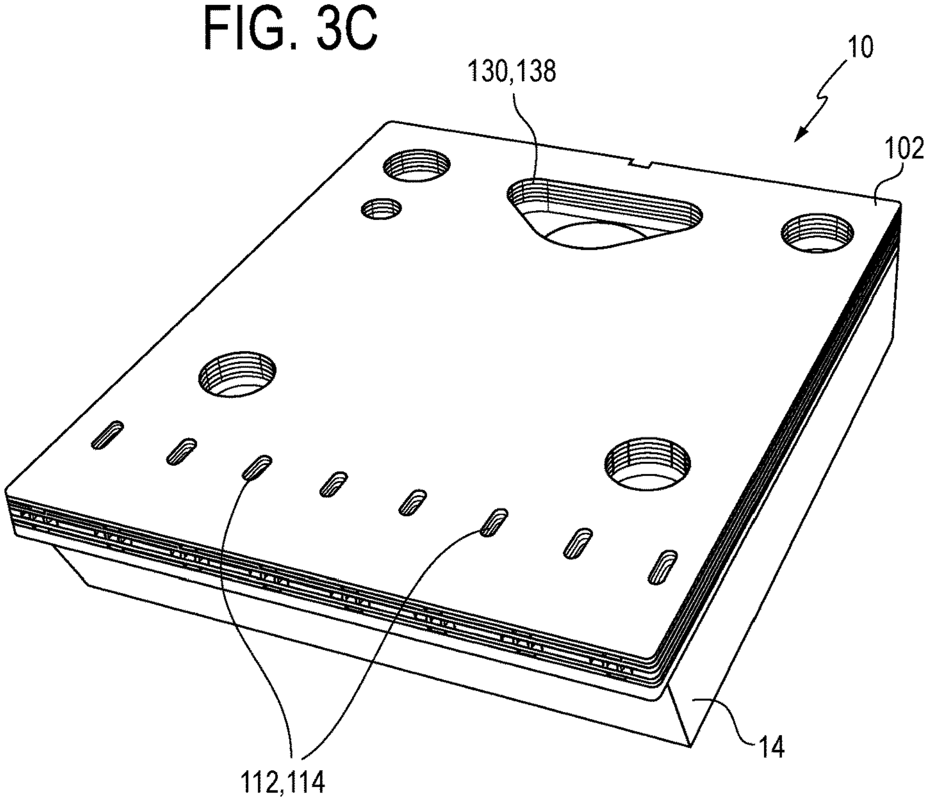

FIG. 3C is a perspective view of the nozzle 10, with the back plate 12 and first plenum plate 101 removed to show the second plate 102, according to an embodiment. The second plate 102 may include one or more first fluid passages 114. In one embodiment, the second plate 102 includes a plurality of spaced apart first fluid passages 114. As shown in FIG. 3B as well, the first fluid passages 114 are generally aligned with the first plenum 116 and disposed in fluid communication therewith. Accordingly, the first fluid passages 114 are configured to receive the first fluid from the first plenum 116. The second plate 102 may also include a portion of the second fluid through passage 138. It is understood that for clarity, some first fluid passages 114, although shown, are not labeled in FIGS. 3B and 3C.

Figure 3D:
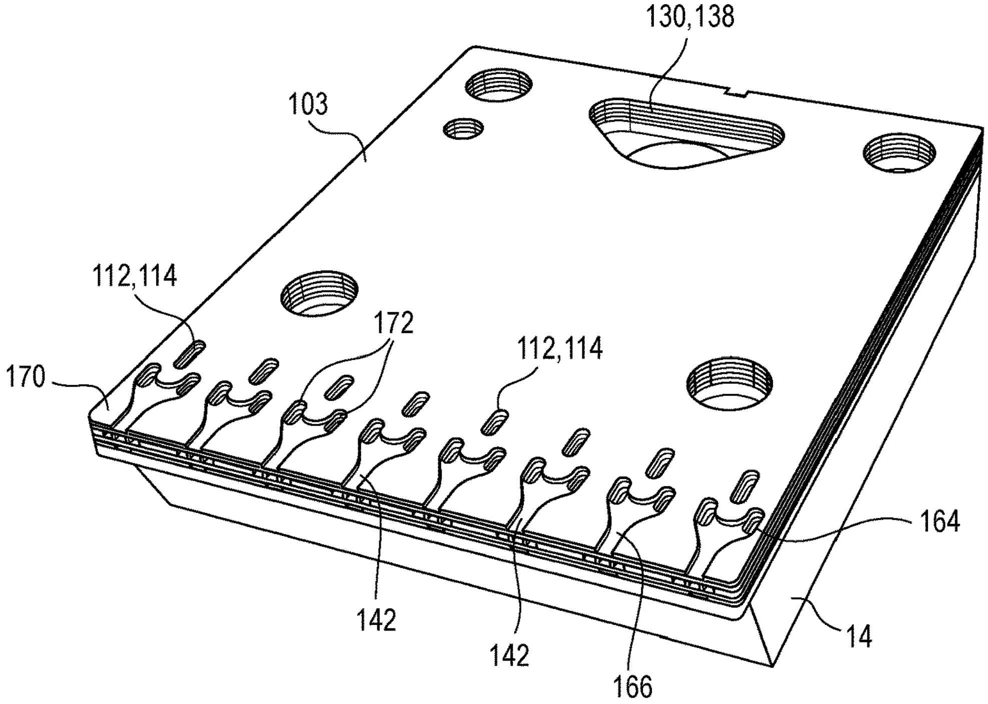

FIG. 3D is a perspective view of the nozzle 10, with the previously described plates 12, 101 and 102 removed to show the third plate 103, according to an embodiment. The third plate 103 also includes first fluid passages 114, aligned with the first fluid passages 114 of the second plate 102. The third plate 103 also includes a portion of the second fluid through passage 138 and the one or more third outlets 142 for discharging the second fluid from the nozzle 10. It is understood that for clarity, some first fluid passages 114 and third outlets 142, although shown, are not labeled in FIG. 3D.

Figure 3E:
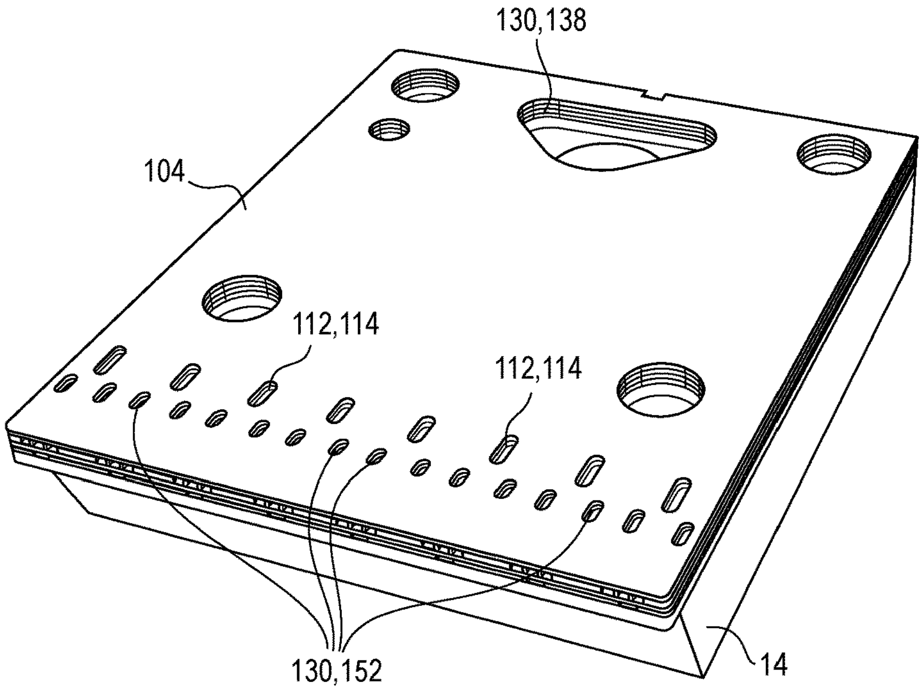

FIG. 3E is a perspective view of the nozzle 10, with previously described plates 12, 101, 102 and 103 removed to show the fourth plate 104, according to an embodiment. The fourth plate 104 may include the first fluid passages 114 aligned with the first fluid passages 114 of the second and third plates 102, 103, and a set of the second fluid delivery passages 152, formed as a plurality of spaced apart openings in the fourth plate 104. The fourth plate 104 may also include a portion of the second fluid through passage 138. It is understood that for clarity, some first fluid passages 114 and second fluid delivery passages 152, although shown, are not labeled in FIG. 3E.

Figure 3F:
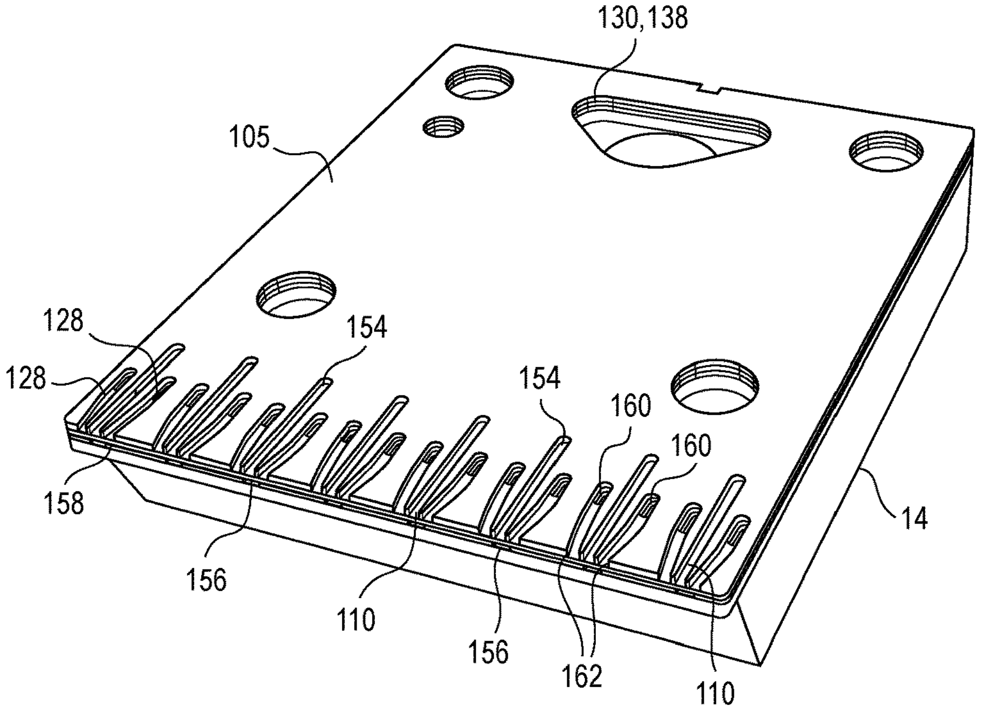

FIG. 3F is a perspective view of the nozzle 10, with previously described plates 12, 101, 102, 103 and 104 removed to show the discharge plate 105, according to an embodiment. The discharge plate 105 may include the one or more orifices 110. Each orifice 110 may include an internally disposed orifice channel 154 and an orifice opening 156 in fluid communication with the internally disposed orifice channel 154. The orifice opening 156 is disposed at an edge 158 of the discharge plate 105 and is configured to have the first fluid discharged therethrough. The orifice opening 156 and orifice channel 154 may be formed as a single, continuous slot in the discharge plate 105. It is understood that for clarity, some orifices 110, orifice channels 154 and orifice openings 156, although shown, are not labeled in FIG. 3F.

Referring still to FIG. 3F, the discharge plate 105 may also include a plurality of first outlets 128. Each first outlet 128 may include an internally disposed outlet channel 160 and an outlet opening 162 in fluid communication with the outlet channel 160. The outlet opening 162 is disposed at the edge 158 of the discharge plate 105 and is configured to have the second fluid discharged therethrough. The outlet opening 162 and the outlet channel 160 of each first outlet 128 may be formed as a single, continuous slot. In one embodiment, the nozzle 10 may include two first outlets 128 associated with each orifice 110. For example, each orifice 110 may extend between a spaced apart pair of first outlets 128. A portion of the second fluid through passage 138 may also be formed in the discharge plate 105. It is understood that for clarity, some first outlets 128, outlet channels 160 and outlet openings 162, although shown, are not labeled in FIG. 3F.

Figure 3G:
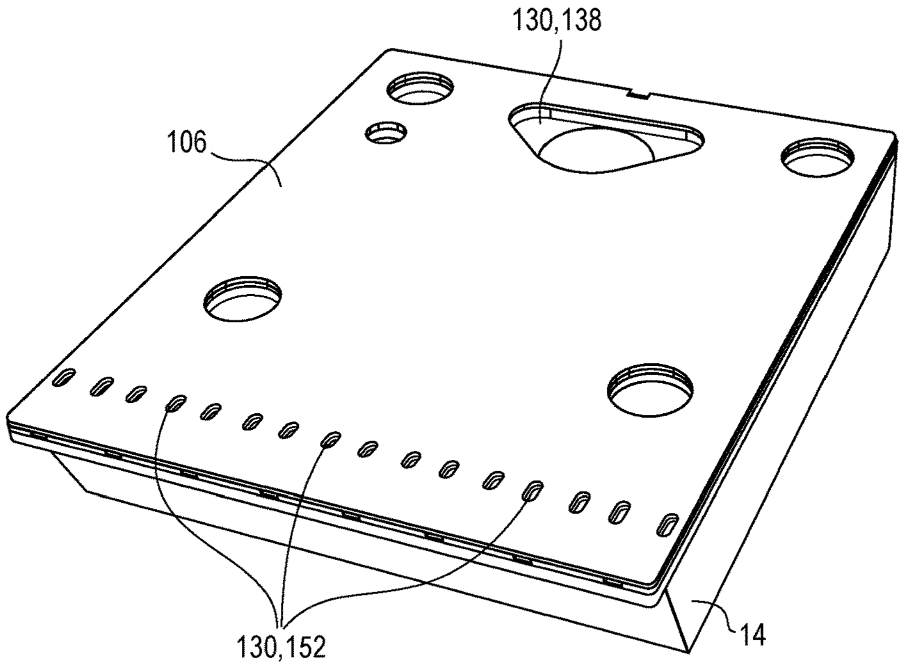

FIG. 3G is a perspective view of the nozzle 10, with previously described plates 12, 101, 102, 103, 104 and 105 removed to show the sixth plate 106, according to an embodiment. The sixth plate 106 may include a set of second fluid delivery passages 152, configured for receiving the second fluid and allowing the second fluid to flow therethrough. The sixth plate 106 also includes a portion of the second fluid through passage 138. It is understood that for clarity, some second fluid delivery passages 152, although shown, are not labeled in FIG. 3G.

Figure 3H:
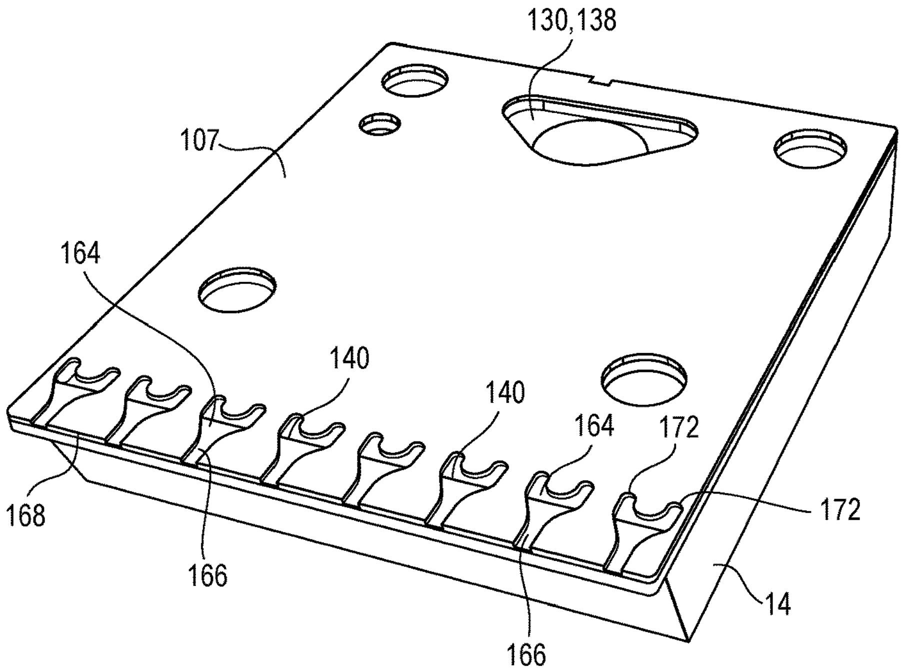

FIG. 3H is a perspective view of the nozzle 10, with previously described plates 12, 101, 102, 103, 104, 105 and 106 removed to show the seventh plate 107, according to an embodiment. The seventh plate 107 includes the one or more second outlets 140 for discharging the second fluid from the nozzle 10. The seventh plate 107 also includes a portion of the second fluid through passage 138. It is understood that for clarity, some second outlets 140, although shown, are not labeled in FIG. 3H.

Figure 3I:
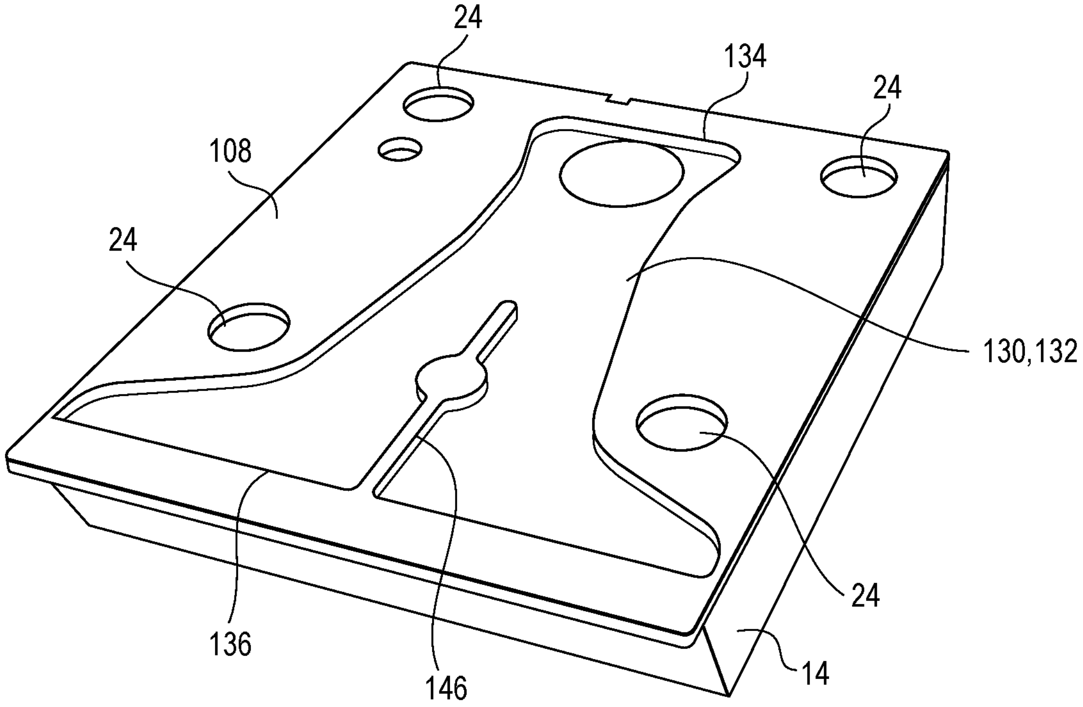

FIG. 3I is a perspective view of the nozzle 10, with previously described plates 12, 101, 102, 103, 104, 105, 106 and 107 removed to show the second plenum plate 108, according to an embodiment. The second plenum plate 107 includes the second plenum 132. The second plenum 132 is aligned and disposed in fluid communication with the second fluid through passage 138 to receive the second fluid from the second fluid through passage 138. In addition, the second plenum 132 is aligned and disposed in fluid communication with the second outlets 140 of the seventh plate 107, such that the second fluid may flow from the second plenum 132 to the one or more second outlets 140.

In one embodiment, the front plate 14 is formed as a support plate configured to provide strength and rigidity to nozzle 10. In one embodiment, the front plate 14 may be formed without any fluid flow passages therein. That is, in one embodiment, fluid does not flow within the front plate 14.

In the embodiments above, the first fluid flow path 112 may extend through the first plenum plate 101, the second plate 102, the third plate 103 and the fourth plate 104. For example, in one embodiment, the first fluid flow path 112 may include the first plenum 116, and the first fluid passages 114 formed in the second, third and fourth plates 102, 103, 104. Thus, in one embodiment, the first fluid may be received in the first plenum 116 from the first inlet passage 16. The first fluid passages 114 are configured to receive the first fluid form the first plenum 116, and allow for the first fluid to flow through the second plate 102, third plate 103 and fourth plate 104 to the one or more orifices 110 in the discharge plate 105. The first fluid may be received in the internally disposed orifice channel 154 and flow out of the orifice opening 154 of respective orifices 110.

The second fluid flow path 130, according to an embodiment, may extend in each plate of the plurality of plates 100. For example, in one embodiment, the second fluid flow path 130 may include the second fluid flow through passage 138, the second plenum 132, and the sets of second fluid delivery passages 152. The second fluid flow path 130 is fluidically connected to the one or more first outlets 128, the one or more second outlets 140 and the one or more third outlet 142.

Referring to FIGS. 3A-3I, the second fluid may be received in the second fluid through passage 138 from the second inlet passage 20 of the back plate 12. The through passage 138 extends through the nozzle plates to the second plenum 132, and the second plenum 132 is configured to receive the second fluid from the through passage 138. The second outlets 140 are configured to receive the second fluid from the second plenum 132. As described below, the second outlets 140 are configured to discharge one portion of the second fluid and allow a remaining portion of the second fluid to flow to a set of second fluid delivery passages 152. The second fluid delivery passages 152 on the sixth plate 106 are aligned with the first outlets 128 formed on the discharge plate 105. Accordingly, the first outlets 128 are configured to receive the second fluid from the first set of second fluid passages 152. The second fluid is received in the outlet channel 160 of each outlet 128, and flows to the outlet opening 162 for discharge from the nozzle 10.

As indicated above, the second outlets 140 are configured to discharge one portion of the second fluid and allow the remaining portion of the second fluid to flow to the second fluid delivery passages 152 in the sixth plate 106. Subsequently, the first outlets 128, aligned with the second fluid delivery passages 152 of the sixth plate 106, are configured to receive the remaining portion of the second fluid from the second fluid delivery passages 152 of the sixth plate 106. A second portion of the second fluid may be discharged from the first outlets 128, and a further-remaining portion of the second fluid may flow to the second fluid delivery passages 152 in the fourth plate 104. The third outlets 142 are aligned with and are configured to receive the further-remaining portion of the second fluid from the second fluid delivery passages 152 and discharge the further-remaining portion of the second fluid.

Referring to FIGS. 3D and 3H, in one embodiment, the one or more second outlets 140 and the one or more third outlets 142 may be similarly or identically formed. For example, each outlet of the first and second outlets 140, 142 may include a second outlet channel 164 and a second outlet opening 166 fluidically connected to the second outlet channel 164. The second outlet openings 166 are formed in an edge of the nozzle plate in which the second or third outlets 140, 142 are formed. For example, on the seventh plate 107, the second outlet openings 166 are formed on an edge 168 of the plate 107, and on the third plate 103, the second outlet openings 166 are formed on an edge 170 of the plate 103. The second outlet channel 164 is configured to receive the second fluid from the one or more second fluid delivery passages 152. In one embodiment, the second and third outlets 140, 142 may each include a pair of lobes 172 aligned with, and configured to receive the second fluid from a corresponding pair of second fluid delivery passages 152.

Accordingly, in the above embodiments, a nozzle 10 having a back plate 12, front plate 14, and a plurality of nozzle plates 100 secured therebetween, may provide increased stiffness or rigidity in the nozzle 10, due, at least in part, to a projection disposed in a plenum of at least one of the nozzle plates. The projection, such as the second projection 146, is positioned and configured to increase stiffness or rigidity of the nozzle plate on which it is formed. The projection may also provide support, by way of a reaction force, against bending of an immediately adjacent nozzle plate. Thus, in the embodiments above, a resistance to unintended leakage or loss of seal between adjacent nozzle plates resulting from unintentional bending or deflecting of the plates may be improved relative to existing laminated plate type nozzles.

In addition, due to increased stiffness or rigidity, the nozzle plates described herein have an increased resistance to deformation. Accordingly, the nozzle described herein may allow for fluid flow within the flow path(s) at a higher pressure than in a similarly formed nozzle without one or more of the projections 122, 146. With fluid provided at a higher pressure in the fluid flow path(s), the fluid may be distributed across a width of the nozzle and nozzle plates, and subsequently, to laterally outward positioned orifices and outlets at a pressure where desired application parameters may be met. Thus, the fluid may be distributed laterally across a width of the nozzle without manufacturing the nozzle to include internal fluid flow diverting elements. Further, by allowing the fluid to flow in the height and width directions in the flow path(s) upon receipt from a higher-pressure portion of the flow path, undesirable accumulation of back pressure may be reduced or avoided altogether. That is, the fluid may flow more freely in a plenum of the types described herein compared to fluid flowing in flow paths in conventional nozzles which incorporate flow diverting elements. Further still, a shape of the plenums described herein may allow for a gradual decrease in fluid pressure as the fluid is distributed laterally within the nozzle, and for more even distribution of the fluid and fluid pressure within the plenum. For example, the fluid may be received at a portion of the plenum having a first width, and flow to a portion of the plenum having a second width, greater than the first width. Thus, the fluid pressure will be higher at the first width and sufficient pressure may be provided to distribute the fluid laterally outward within the plenums without the use of an internal fluid flow diverting element.

It is understood that the figures may depict a plurality of one or more elements described herein. However, for clarity, each and every like element may not be labeled in the figures. Rather, representative elements and portions of those elements may be labeled in the figures, and those having ordinary skill in the art would recognize that similarly depicted elements, though not labeled, may correspond to those labeled elements.

In one embodiment, the first projection 122 may be omitted from the first plenum 116, while the second projection 146 extends within the second plenum 132. Accordingly, with a first fluid in the first plenum 116 at a first pressure, a force may be applied to the plates between the first and second plenum plates 101, 108. However, bending of a plate into the second plenum 132 may be resisted by the second projection 146 in the second plenum plate 108. In another embodiment, the first projection 122 and the second projection 146 may extend in the first plenum and the second plenum, respectively. Accordingly, with a second fluid in the second plenum 132 at a second pressure, bending of the plates between the first and second plenum plates 101, 108 into the first plenum 116 may be resisted by the first projection 122.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims. It is further understood that various features from the embodiments described above and shown in the drawings may be combined with other embodiments described herein and shown in the drawings.

The invention claimed is:

1. A nozzle comprising:

a back plate having a first inlet passage and a first discharge opening at one end of the first inlet passage;

a front plate; and a plurality of nozzle plates secured between the back plate and the front plate, the plurality of nozzle plates including one and only one first plenum plate, one and only one second plenum plate and a discharge plate, the one and only one first plenum plate having a first plenum having a generally triangular shape, the one and only one second plenum plate having a second plenum having a generally triangular shape, the first plenum plate having a first plenum projection extending into the first plenum, and the second plenum plate having a second plenum projection extending into the second plenum, the discharge plate being disposed between the one and only one first plenum plate and the one and only one second plenum plate and adjacent to at least one of the one and only one first plenum plate and the one and only one second plenum plate, the discharge plate having one or more orifices, wherein the first plenum is disposed in fluid communication with the first inlet passage and is configured to receive a first fluid from the first inlet passage via the first discharge opening, and the one or more orifices are disposed in fluid communication with the first plenum and are configured to receive the first fluid from the first plenum, the one or more orifices each including an orifice opening at an edge of the discharge plate configured to discharge the first fluid.

2. The nozzle of claim 1, wherein the first plenum increases in width moving along a height direction toward a base of the first plenum.

3. The nozzle of claim 1, wherein the second plenum projection extends in a height direction from a base of the second plenum.

4. The nozzle of claim 1, wherein the second plenum projection includes a section of increased width.

5. The nozzle of claim 1, wherein:

the back plate further comprises a second fluid inlet passage having a second discharge opening at one end;

the one and only one first plenum plate and discharge plate further comprise a second fluid through passage disposed in fluid communication with the second fluid inlet and configured to receive a second fluid from the second fluid inlet passage via the second discharge opening, the second plenum is disposed in fluid communication with the second fluid through passage and is configured to receive the second fluid from the second fluid through passage, and one or more nozzle plates of the plurality of nozzle plates further comprises one or more outlets disposed in fluid communication with the second plenum, the one or more outlets configured to receive the second fluid from the second plenum, each outlet of the one or more outlets comprising an outlet opening formed in an edge of the nozzle plate configured to discharge the second fluid.

6. The nozzle of claim 5, wherein a free end of the second plenum projection is spaced in a height direction from the second fluid through passage.

7. The nozzle of claim 1, wherein the first plenum projection has a free end spaced in the height direction from the first discharge opening.

8. The nozzle of claim 1, wherein the first plenum projection has a section of increased width.

9. The nozzle of claim 1, wherein the one and only one first plenum plate has a constant thickness.

10. The nozzle of claim 1, wherein the one and only one second plenum plate has a constant thickness.

11. The nozzle of claim 1, wherein the plurality of nozzle plates further comprises one or more nozzle plates disposed between the one and only one first plenum plate and the discharge plate, the one or more nozzle plates having one or more first fluid passages fluidically connecting the first plenum to the one or more orifices.

12. The nozzle of claim 5, wherein the one or more outlets are formed in the discharge plate.

13. The nozzle of claim 12, wherein the plurality of nozzle plates further comprises a first one or more nozzle plates disposed between the discharge plate and the one and only one second plenum plate, the second fluid through passage extending through the first one or more nozzle plates, wherein one or more second outlets are formed in a nozzle plate of the first one or more nozzle plates, the one or more second outlets disposed in fluid communication with, and between, the second plenum and the one or more outlets formed in the discharge plate, the one or more second outlets configured to discharge a portion of the second fluid.

14. The nozzle of claim 13, wherein the first one or more nozzle plates include at least two nozzle plates, and one or more second fluid delivery passages are formed in one of the at least two nozzle plates, the one or more second fluid delivery passages disposed between and in fluid communication with the one or more second outlets and the one or more outlets of the discharge plate.

15. The nozzle of claim 14, wherein the plurality of nozzle plates further comprises a second one or more nozzles plates disposed between the discharge plate and the first plenum plate, the second fluid through passage and one or more first fluid passages extending through the second one or more nozzle plates, the one or more first fluid passages disposed between and in fluid communication with the first plenum and the one or more orifices, wherein one or more third outlets are formed in a nozzle plate of the second one or more nozzle plates, the one or more third outlets disposed in fluid communication with the outlets of the discharge plate, the one or more third outlets configured to discharge another portion of the second fluid.

16. The nozzle of claim 15, wherein the second one or more nozzle plates include at least two nozzle plates, and one or more additional second fluid delivery passages are formed in one of the at least two nozzle plates, the one or more additional second fluid delivery passages disposed between and in fluid communication with the one or more third outlets and the one or more outlets of the discharge plate.

17. The nozzle of claim 1, wherein the first plenum projection and the second plenum projection are aligned in a thickness direction of the plurality of nozzle plates.

18. The nozzle of claim 1, wherein the first plenum projection is substantially aligned with the second plenum projection.

19. The nozzle of claim 18, wherein the first plenum projection includes a section of increased width and the second plenum projection includes another section of increased width, wherein the respective sections of increased width are substantially aligned with one another.

* * * * *